United States Patent Office 3,255,993
Patented June 14, 1966

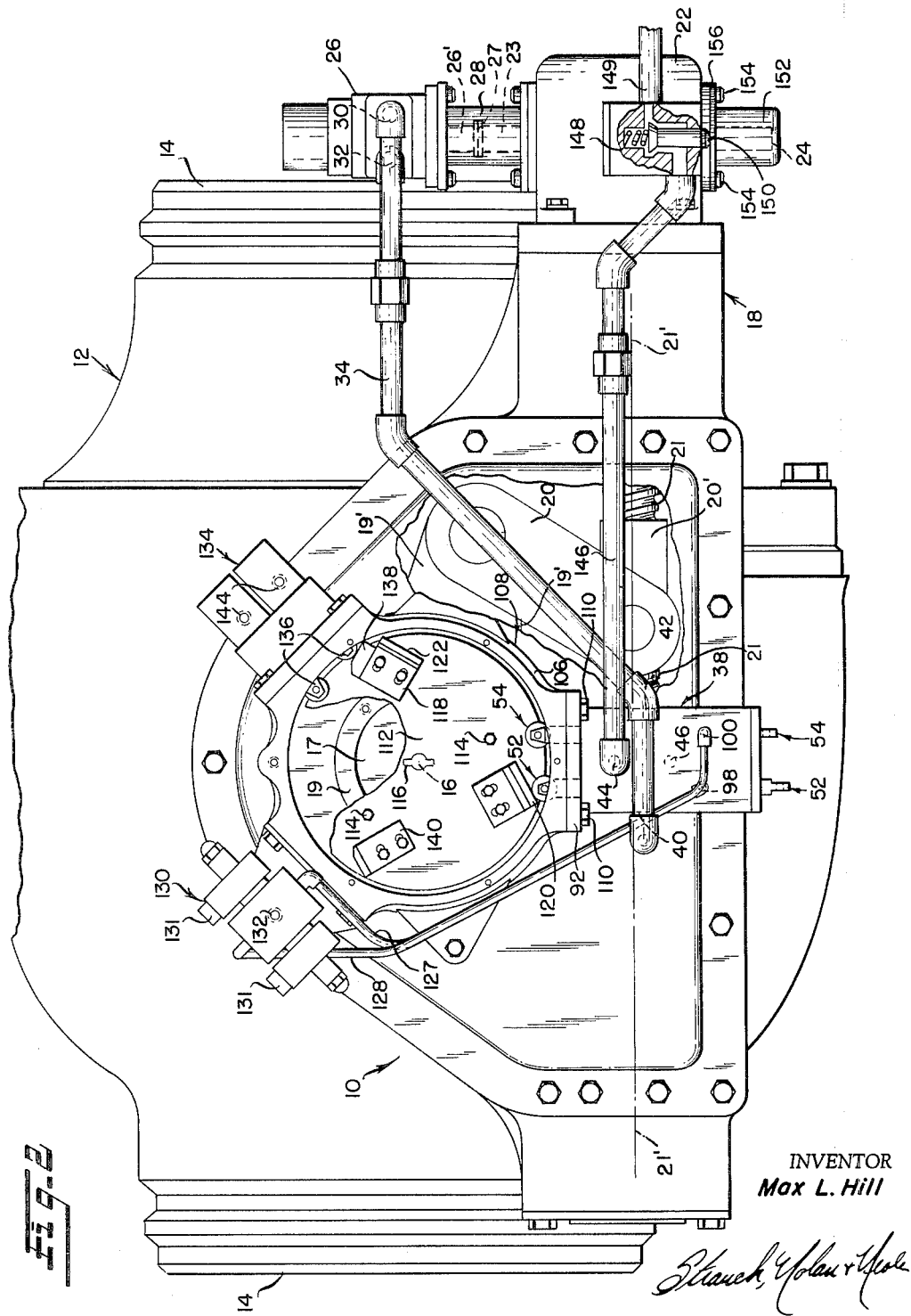

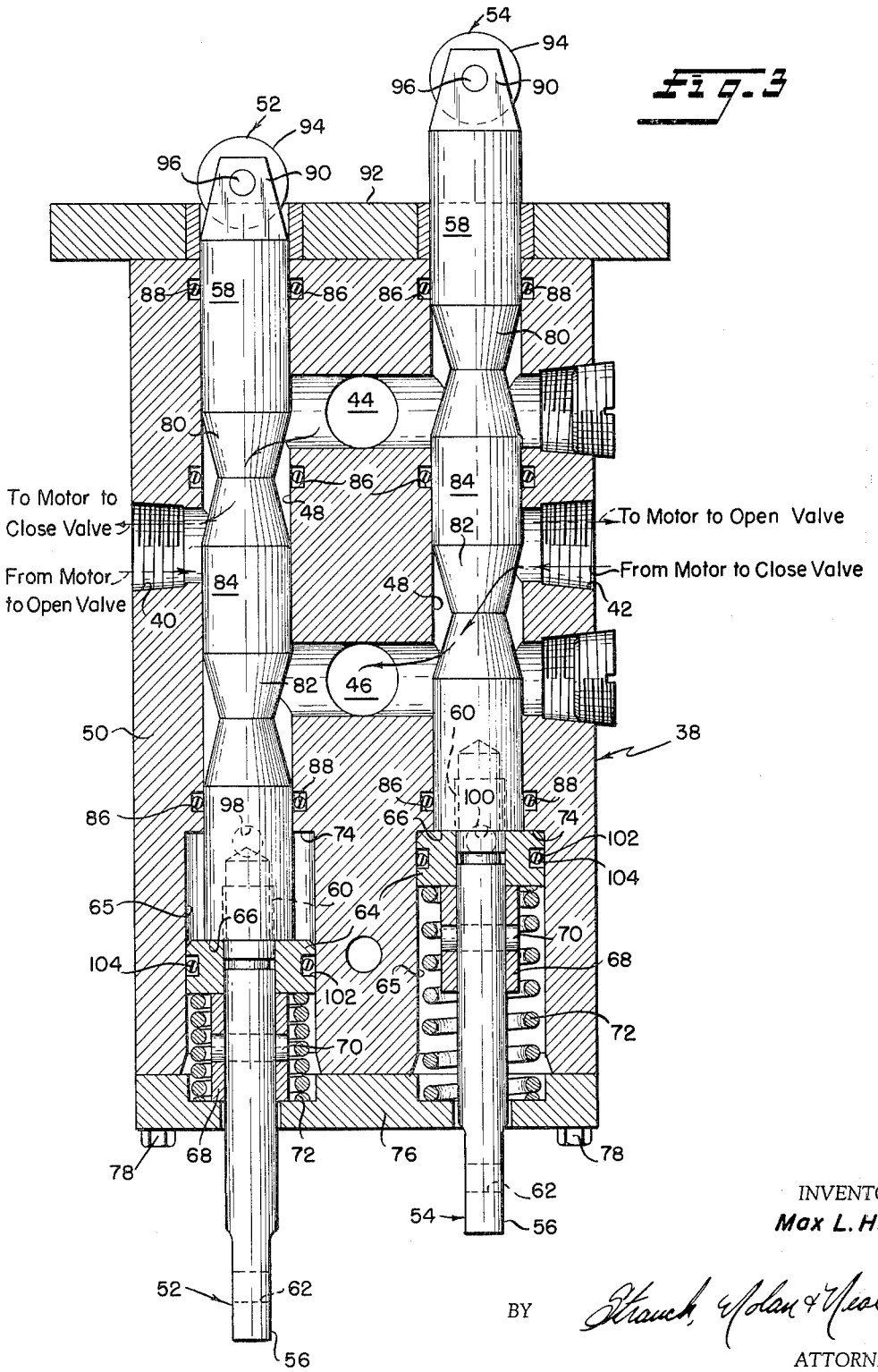

3,255,993
POWER OPERATOR FOR VALVES
Max L. Hill, Gibbon, Nebr., assignor to Rockwell Manufacturing Company, Pittsburgh, Pa., a corporation of Pennsylvania
Filed Sept. 28, 1962, Ser. No. 226,861
5 Claims. (Cl. 251—29)

This invention relates to valves and particularly to novel apparatus for controllably operating valves by power.

Valves of the type disclosed in copending application Serial No. 194,102, and now abandoned, are frequently installed in remote locations relatively inaccessible to service and operating personnel. Therefore, it is advantageous to provide these valves with power operators adapted to be remotely controlled. Such power operators necessarily have built-in limit controls to prevent damage to the valve which might occur if the valve were inadvertently run past its open or closed position. In prior attempts to so controllably operate valves by power, the following problems appear. First, known power operators are complex devices having separate selector and limit valves and generally require excessive maintenance. Secondly, the operation of the built-in limit controls of known power operators is not readily apparent to an operator at the valve site. Thirdly, known power operators need clutch mechanisms to disengage the operating motor to prevent undue hindrance or drag when the valve is being operated manually. Fourthly, known power operators for valves which are adapted to be remotely controlled are a source of danger during manual operation because of the possibility of inadvertent motor actuation from a remote control station.

To meet the problems indicated above, the present invention provides a fluid operated motor to drive the actuating mechanism of the main valve and a unitary dual control valve assembly to completely control the motor. The dual control valve provides for manual, on-site operation, remote-control operation, and further serves as a limit means to stop motor operation when the main valve reaches its full open or full closed position. The dual control valve assembly responds to cams driven directly with the valve element to establish the above limit positions for the valve. The dual control valve is so arranged that both sides of the fluid operated motor are normally vented so that during manual operation of the valve the fluid motor may be rotated without building up a hindering back pressure. Finally, the power operator of the present invention includes a safety shut-off valve in the fluid supply for the reversible motor. This valve is arranged to shut off the fluid power supply whenever a handwheel is mounted on the valve actuating mechanism for manual operation.

Accordingly, a primary object of the invention is to provide in valves an improved power operator of simple, reliable construction.

Another object is to provide an improved power operator for valves which gives an external, visual indication from the position of its local-control handles of the proper functioning of its limit controls.

A further object is to provide in a main valve an improved power operator which permits facile manual actuation of the main valve in emergencies and the like and which prevents dangerous, inadvertent motor operation of the main valve during such manual actuation.

Another object of the invention is to provide an improved dual control valve assembly for a fluid motor operated main valve.

A further object is to provide in a power operated valve an improved limit-position cam arrangement to prevent over-running of the valve.

These and other objects of the invention will appear from the following description and appended claims when read in conjunction with the accompanying drawings wherein:

FIGURE 2 is a top view of the valve assembly and power operator of FIGURE 1 shown with the cam housing cover and valve position indicator removed; and FIGURE 3 is a horizontal central section of the dual control valve of the power operator of the invention taken on line 3—3 of FIGURE 1.

Figure 1:
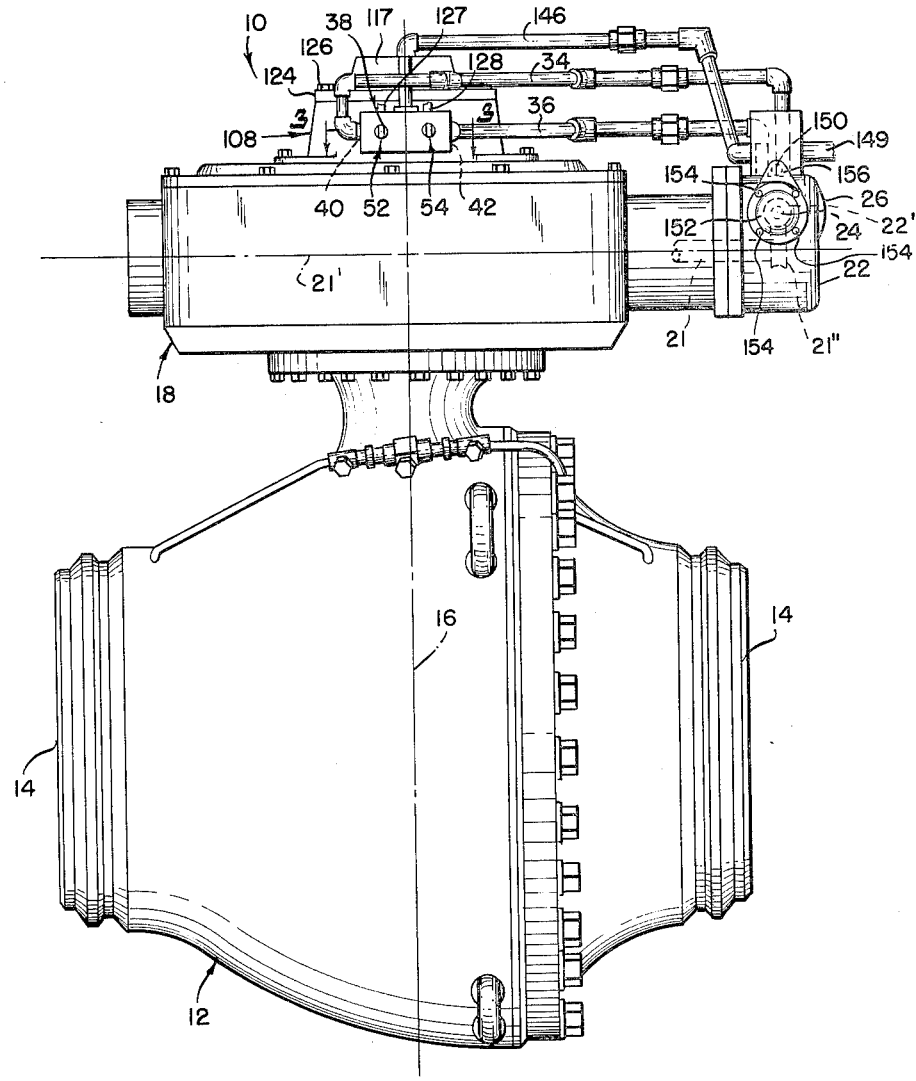
FIGURE 1 is a front view of a spherical plug valve assembly with a power operator according to a preferred embodiment of the invention mounted thereon.

In FIGURES 1 and 2, the power operator of the present invention, indicated generally at 10, is exemplarily shown mounted on a spherical plug valve assembly 12. This plug valve assembly is of the type shown and described in the above mentioned co-pending application. As described therein; valve 12 includes a spherical plug, not shown, having a horizontal bore for connecting valve ports 14 for through flow when valve 12 is open. The spherical plug rotates through 90° about a vertical axis, indicated at 16 in FIGURE 1, to close valve 12. The plug is rotated by a valve stem 17 extending along axis 16 into valve actuating assembly 18. Within the actuating assembly 18, valve stem 17 is keyed to a hub 19 of a lever 19' which is rotated about axis 16 by a link 20 pivoted at one end to the outer end of lever 19' and at the other end to a ball-nut 20'. Ball-nut 20' travels along a horizontal drive-screw 21 lying along and rotating about horizontal axis 21'. Drive-screw 21 is rotated by a pinion 21" fixed coaxially thereon and located in gearbox 22. Pinion 21" is in turn operated by a worm 22' on a shaft 23 extending through both ends of gearbox 22. For manual operation of valve assembly 12, a handwheel, not shown would be fitted on the front extension 24 of shaft 23. Further details of valve 12 and actuating assembly 18 may be obtained from the above mentioned patent application.

*Reversible fluid motor 26*

The power operator 10 of the present invention has as one of its major components a reversible fluid motor 26 mounted on gearbox 22 of the valve 12 by a tubular flanged mounting collar 28. Fluid motor 26 may be any suitable type of hydraulic or pneumatic motor. The particular motor here employed is a pneumatic motor having its output shaft 26' connected to the worm shaft 23 of gearbox 22 at a coupling 27 within collar 28. Motor 26 has two fluid ports 30 and 32 which serve as a fluid inlet and a fluid outlet, respectively, when valve 12 is being closed and as an outlet and inlet, respectively, when valve 12 is being opened. Reversible fluid flow to ports 30 and 32 is accomplished through conduits 34 and 36, respectively, by a dual control valve assembly 38.

*Dual control valve assembly 38*

Dual control valve assembly 38, as more clearly shown in FIGURE 3, has ports 40 and 42 connected to conduits 34 and 36, respectively and has a pressure inlet 44 and an exhaust outlet 46. Slidably mounted in through bores 48 in body portion 50 of the valve assembly 38 are two independently operating valve members 52 and 54. Valve members 52 and 54 include rod-like manual-control extensions 56 and generally cylindrical valve spools 58 threadedly interconnected to the extensions 56 as at 60. Manual-control extensions have through holes 62 in their protruding ends for receiving any conventional manual operating means such as a knob or a simple linkage-lever operator.

Within valve assembly 38, annular pistons 64 are respectively mounted on rod-like extensions 56 to slide within enlarged bores 65 in valve body 50. Pistons 64 are firmly held against annular end shoulders 66 of valve spools 58 by means of tubular collars 68 mounted on rod-like extensions 56 by pins 70 extending therethrough. Compression coil springs 72 are contained in the enlarged bores 65 against piston members 64 to urge valve members 52 and 54 to a position in which pistons 64 contact end shoulder surfaces 74 of bores 65. Coil springs 72 are axially restrained in bores 65 by a spring retaining cover 76 secured to the valve body 50 by screws 78.

Valve spools 58 each have a double conical cutaway 80 connecting with pressure inlet 44 in the valve body 50. The spools also have a second double conical cutaway 82 connecting with the exhaust outlet 46. As shown in FIGURE 3, valve member 54 is in an extreme position established by the abutment of piston 64 with shoulder 74 in the valve body. In this spring-biased position, the cutaway 82 of valve member 54 connects valve port 42 with exhaust outlet 46 of the valve body. FIGURE 3 shows valve member 52 in another extreme position in which coil spring 72 has been compressed and wherein cutaway 80 connects pressure inlet port 44 with port 40 of valve body 50. This extreme position of a valve member is established by abutment of collar 68 with spring cover 76. The direction of fluid flow established by the FIGURE 3 positions of valve members 52 and 54 operates motor 26 to close the main valve 12.

As further shown in FIGURE 3, valve spools 58 have solid cylindrical portions 84 between cutaways 80 and 82 of sufficient length to close off valve ports 40 and 42 when the valve members are in a position intermediate between the extreme positions shown in FIGURE 3.

Further, valve body 50 is suitably provided with grooves 86 having O-rings 88 therein to sealingly engage valve spools 58 to prevent leakage of the motor operating fluid. Spools 58 have extensions 90 protruding through a mounting plate 92 rigidly attached to one end of valve body 50. The extensions 90 carry cam contacting rollers or followers 94 rotatably mounted on pins 96 for purposes explained below.

Dual valve assembly 38 is also provided with two ports 98 and 100 connected with bores 65 adjacent shoulders 74 to supply a fluid pressure to act on pistons 64 to operate valve members 52 and 54, respectively, against the bias of springs 72. Annular pistons 64 are provided with grooves 102 with O-rings 104 therein to produce a fluid seal between the pistons and the valve body bores 65. Thus, dual valve assembly 38 may be remotely, pneumatically controlled by connecting suitable control pressure conduits to the ports 98 and 100.

*Cam assembly 108*

As shown in FIGURE 2, the mounting plate 92 of dual valve assembly 38 is secured to a housing 106 of cam assembly 108 by means of screws 110. Valve members 52 and 54 of the valve assembly 38 protrude through openings provided in cam housing 106 into the interior thereof. Within cam housing 106 a flat circular cam plate 112 is rigidly fixed to the valve stem 17 or to hub 19 of the valve actuating mechanism by means of screws 114. Cam plate 112 has a slotted circular opening 116 to removably, nonrotatably receive a vertical rod, not shown, which rotates a valve position indicator 117 (FIGURE 1). Adjustably mounted on cam plate 112 by means of screws 118 are dual control valve actuating cams 120 and 122. As shown in FIGURE 2, plug valve 12 is in its fully open position and open-limit cam 120 is in contact with the roller 94 of valve member 52 and has forced that valve member away from its spring-biased position.

As shown in FIGURE 1, a cam housing cover 124 is secured to the cam housing 106 by means of screws 126. The drive rod, not shown, for indicator 117 rotatably extends through cover 118 to drive indicator 117 thereabove.

As shown in FIGURE 2, control pressure conduits 127 and 128 are connected to ports 98 and 100 of the dual valve assembly 38 and may be connected to a solenoid valve assembly 130. Solenoid valve assembly 130 may be conveniently mounted on cam housing 106 but does not coact with any mechanism therein. Valve assembly 130 is a conventional commercial device having two independent solenoid valves which are biased to connect conduits 127 and 128 to an exhaust port in valve assembly 130 vented to atmosphere. The solenoid valves may be independently actuated from a remote station by electrical means terminating at 131 to connect selectively conduit 127 or 128 to a source of fluid pressure, not shown, connected to valve assembly 130 through port 132. Thus, by use of a solenoid valve assembly located at the main valve site and connected to a source of fluid pressure, the dual control valve assembly 38 may be electrically controlled from a remote station.

Also mounted on cam housing 106 may be a microswitch assembly 134. This assembly has two conventional microswitches actuated by two reciprocating switch operating elements which terminate in rollers 136 which are adapted to be contacted by cams 138 and 140 respectively. Microswitch assembly 134 is adapted to be conventionally connected to remote indicator lights through electrical connections 144.

*Safety shutoff system*

As shown in FIGURE 2, the pressure inlet port 44 of dual valve assembly 38 is connected by means of supply conduit 146 to safety shutoff valve, as schematically illustrated, 148. This shutoff valve is of conventional construction and is spring loaded to close. The valve 148 may be opened by depressing an actuating plunger 150 extending through one end thereof. A protective cover 152 is normally mounted over handwheel shaft extension 24 and is secured to gearbox 22 by means of screws 154. When cover 152 is installed, an ear-like flange portion 156 of cover 152 contacts and depresses plunger 150 and thus normally keeps valve 148 open.

*Installation*

In an exemplary installation, spherical plug valve 12 may be utilized in a gas pipeline. In this installation the supply conduit 149 for fluid motor 26 may be connected directly to the pipeline to supply motor operating fluid therefrom. However, in other installations a separate source of motor operating fluid may be utilized. In either installation, exhaust port 46 of the dual valve assembly 38 may be vented to atmosphere or may be connected to a suitable receiving means for the operating fluid exhausted from motor 26. Further, in the remote electrical control set-up illustrated in FIGURE 2, the solenoid valve assembly 130 is connected at 132 to a source of suitable fluid pressure to operate the dual valve assembly 38. In the gas pipeline installation, this source of pressure may be the pipe line itself and may include a pressure reducing device in the supply line to inlet 132 of valve assembly 130.

*Operation*

A number of modes of operation are possible in the present invention. That is, the power operator may be manually controlled at the valve site, remotely controlled by pneumatic means, or remotely controlled by electrical means. Manual operation of the power operator is basic to the other modes and will be discused first.

Starting with main plug valve 12 in an intermediate position between its fully open and fully closed position, cams 120 and 122 of the cam assembly 108 will be out of contact with the rollers 94 of the dual control valve assembly 38. The valve members 52 and 54 of the dual control valve assembly will therefore be spring-biased to a position in which each of the two ports 40 and 42 of the control valve assembly are connected to exhaust outlet 46.

If valve member 52 is then moved by means of rod-like extension 56 against the bias of spring 72 to the position shown in FIGURE 3, the pressure supply port 44 in dual valve assembly 38 will be connected through cutaway 80, port 40, and conduit 42 to port 30 of motor 26. This will result in a pressure differential across the fluid motor 26 and will produce rotation of the motor in a direction to close the main plug valve. Motor 26 will exhaust fluid through motor port 32, conduit 36, valve port 42, cutaway 82, and exhaust outlet 46. Cam plate 112 rotates with the plug of the main valve 12 and in closing turns clockwise as seen in FIGURE 2. Cam 122 thus approaches roller 94 of the valve member 54 as the main plug valve approaches its closed position. Upon contact, the cam 122 urges the valve member 54 against the bias of spring 72 so that solid cylindrical spool portion 84 of member 54 closes off the port 42 of valve 28. Thus with the exhaust connection from port 32 of motor 26 cut off, motor operation ceases and a closed limit position for main plug valve 12 is established. As long as cam 122 keeps valve port 42 closed off by means of portion 84 of valve member 54, no further rotation in a closed direction of motor 26 may take place regardless of the position of valve member 52 which may therefore be released to its bias position.

Now, to open spherical plug valve 12, valve member 54, which is in its intermediate position closing off port 42 because of cam 122, is manually moved further against the bias of spring 72 to connect valve port 42 to pressure supply port 44 by means of cutaway 80. Thus motor port 32 is now connected to a pressure source and motor port 30 is connected to an exhaust outlet. The resulting pressure differential across motor 26 causes rotation to open the main plug valve 12. Cam plate 112 rotates in a counterclockwise direction during the opening of valve 12 and brings cam 120 into contact with roller 94 of valve member 52 as valve 12 nears its fully open position. Cam 120 finally urges valve member 52 against the spring bias to cut off the valve port 40 which is now serving as an exhaust outlet for the motor 26. Again this stops motor rotation and establishes an open limit position for the main plug valve 12.

As shown in FIGURE 2, during this opening and closing of the main plug valve 12, microswitch assembly 134 will serve to give an electrical indication of the fully open or fully closed position of the valve 12 by means of contact between rollers 136 and the microswitch cams 138 and 140. Valve 12 is in its fully open position as shown in FIGURE 2, and the cam 138 has contacted one of rollers 136 to close a microswitch to indicate the open condition of the valve.

Operation of the dual control valve assembly 38 by either remote control mode is not significantly different in regard to the flow of motor operating fluid through the valve assembly 38. Instead of operating valve members 52 and 54 manually as by means of extensions 56, they are moved by means of fluid pressure acting on pistons 64 against the bias of spring 72. This controlling fluid pressure may be directed to the pistons 64 through ports 98 and 100 from fluid conduits coming directly from a remote control station, or alternatively the controlling fluid pressure may be directed to ports 98 and 100 through conduits such as 127 and 128 leading to a solenoid controlled source of fluid pressure at the main valve site. Thus remote pneumatic or electrical control of the power operator 10 is possible.

In using power operators for valves, it is advantageous to remove the manual handwheel in order to avoid the flywheel effect and the danger of a rapidly spinning handwheel driven by a motor. If desired, this handwheel may be reinstalled on shaft extension 24 for manual operation of the valve by removal of cover 152. As soon as cover 152 has been removed, spring-biased plunger 150 in safety shutoff valve 148 extends and shuts off the pressure supply to dual control valve assembly 38. Plunger 150 remains in its extended position even after a handwheel is installed on shaft extension 24. Thus with a handwheel installed, there is no possibility of an accidental power operation of plug valve 12 either from the valve site or from a remote location.

The invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes which come within the meaning and range of equivalency of the claims are therefore intended to be embraced therein.

What is claimed and desired to be secured by Letters Patent is:

1. A control system for a rotatable valve stem shiftable between valve open and valve closed positions comprising a reversible fluid pressure motor drive connected to the valve stem, a control valve assembly comprising a housing having an inlet connected to a source of fluid pressure and an outlet, two independent valve members shiftably mounted in said housing, means defining separate passages in said housing operably associated with the respective valve members and connected to said motor, means for independently shifting each of said members between limit positions, means coacting with each of said valve members at said limit positions for selectively connecting its associated passage to said inlet or said outlet, and means rotatable with said valve stem for automatically displacing one or the other of said members to an intermediate position to block its associated passage in predetermined positions of rotation of said valve stem.

2. A control system for a valve stem rotatable between valve open and valve closed positions comprising a reversible fluid pressure motor operably connected to the valve stem, a control valve assembly comprising a housing having an inlet connected to a source of fluid pressure and an outlet, two independent valve members shiftably mounted in said housing, means defining separate passages in said housing operably associated with the respective valve members and connected to said motor, means for independently displacing each of said members between limit positions, means coacting with each of said valve members at said limit positions for selectively connecting its associated passage to said inlet or said outlet, and cam means movable with said valve stem for automatically displacing one or the other of said members to an intermediate position to block its associated passage in predetermined positions of said valve stem, said cam means comprising a member secured upon the valve stem and having angularly spaced cam elements adapted to operatively engage said valve members.

3. A control system for a valve stem mounted for rotation between spaced apart valve open and valve closed positions comprising a reversible fluid pressure motor operably connected to said valve stem, means defining a fluid chamber having an inlet connected to a source of fluid pressure and an outlet, means defining first and second passages respectively establishing fluid communication between opposite sides of said motor and said chamber for supplying and exhausting fluid with respect to said motor, a first valve member mounted in said chamber for displacement between spaced apart fluid control positions, means coacting with said first valve member at said positions for controlling fluid communication between said first passage and said inlet and outlet respectively, a second valve member mounted in said chamber for displacement between spaced apart fluid control positions, means coacting with said second valve member at said fluid control positions for controlling fluid communication between said second passage and said inlet and outlet respectively, means for shifting one of said first and second valve members independently of the other to a position where its associated one of said passages is in fluid communication with said inlet, means for positioning the other of said valve members to establish fluid communication between its associated passage and said outlet to thereby operate said motor for moving said stem in a selected direction, and means operably connected to said stem for movement therewith and being operable after predetermined movement of said stem in said selected direction for displacing the other of said valve members to a position where it blocks fluid communication between its associated passage and said output preventing the exhaust of fluid from the other side of said motor and thereby arresting said motor for stopping movement of said valve stem in a predetermined position.

4. The control system defined in claim 3 comprising independent spring means biasing both of said first and second valve members to positions where said first and second passages are in fluid communication with said outlet.

5. The control system defined in claim 3 comprising independent spring means biasing both of said valve members to positions where said first and second passages are connected to said outlet, said valve stem being reversely rotatable by displacing said other valve member to connect said second passage to said inlet and by allowing said one valve member to be displaced by said spring means to the position where said first passage is connected to said outlet.

References Cited by the Examiner
UNITED STATES PATENTS

| | | | |
|---|---|---|---|
| 151,423 | 1874 | Osborn | 251—31 |
| 1,009,962 | 11/1911 | Ezzell | 251—313 X |
| 2,258,585 | 10/1941 | Hedene | 91—2 X |
| 2,431,187 | 11/1947 | Meyer | 91—2 |
| 2,611,391 | 9/1952 | Sainsbury | 137—596.15 |
| 2,644,485 | 7/1953 | Schwendner | 251—14 |
| 2,647,538 | 8/1953 | Demay | 251—14 |
| 2,692,614 | 10/1954 | McLeod | 137—596.15 |
| 2,911,953 | 11/1959 | Killian | 251—58 X |
| 3,013,532 | 12/1961 | Harper | 91—405 |

M. CARY NELSON, *Primary Examiner.*

MILTON KAUFMAN, *Examiner*

A. ROSENTHAL, *Assistant Examiner.*